United States Patent
Hechtl

(10) Patent No.: US 12,018,151 B2
(45) Date of Patent: Jun. 25, 2024

(54) PREPARATION FOR PRODUCING A POLYMER CROSSLINKABLE BY CONDENSATION REACTION, POLYMER COMPOSITION CROSSLINKABLE BY CONDENSATION REACTION, PROCESS FOR PRODUCING A SILICONE ELASTOMER AND SILICONE ELASTOMER

(71) Applicant: Wolfgang Hechtl, Burghausen (DE)

(72) Inventor: Wolfgang Hechtl, Burghausen (DE)

( * ) Notice: Subject to any disclaimer, the term of this patent is extended or adjusted under 35 U.S.C. 154(b) by 145 days.

(21) Appl. No.: 17/186,633

(22) Filed: Feb. 26, 2021

(65) Prior Publication Data

US 2021/0277238 A1    Sep. 9, 2021

(30) Foreign Application Priority Data

Mar. 9, 2020 (DE) .................. 102020202971.7

(51) Int. Cl.
| | | |
|---|---|---|
| C08L 83/04 | (2006.01) | |
| C08G 77/08 | (2006.01) | |
| C08G 77/18 | (2006.01) | |
| C08G 77/388 | (2006.01) | |
| C08K 3/36 | (2006.01) | |
| C08K 5/098 | (2006.01) | |
| C08K 5/5419 | (2006.01) | |
| C08K 5/5425 | (2006.01) | |
| C08K 5/544 | (2006.01) | |
| C08L 83/08 | (2006.01) | |

(52) U.S. Cl.
CPC ............. *C08L 83/08* (2013.01); *C08G 77/08* (2013.01); *C08G 77/18* (2013.01); *C08G 77/388* (2013.01); *C08K 3/36* (2013.01); *C08K 5/098* (2013.01); *C08K 5/5419* (2013.01); *C08K 5/5425* (2013.01); *C08K 5/544* (2013.01); *C08L 2205/02* (2013.01); *C08L 2312/08* (2013.01)

(58) Field of Classification Search
CPC ....... C08G 77/26; C08G 77/388; C08L 83/08; C08L 83/00; C09J 183/08
See application file for complete search history.

(56) References Cited

U.S. PATENT DOCUMENTS

| | | | |
|---|---|---|---|
| 2,843,555 A | 7/1958 | Berridge | |
| 3,077,465 A | 2/1963 | Bruner | |
| 3,280,072 A * | 10/1966 | Frankland | C08G 77/26 528/901 |
| 3,334,067 A | 8/1967 | Weyenberg | |
| 3,383,355 A | 5/1968 | Cooper | |
| 3,508,933 A * | 4/1970 | Yates | C09G 1/12 106/11 |
| 3,621,047 A * | 11/1971 | Golitz | C08L 83/04 528/901 |
| 4,657,967 A | 4/1987 | Klosowski et al. | |
| 5,300,608 A * | 4/1994 | Chu | C08G 77/20 556/466 |
| 7,094,858 B2 | 8/2006 | Sixt et al. | |
| 7,491,786 B2 | 2/2009 | Scheim et al. | |
| 8,217,113 B2 | 7/2012 | Scheim et al. | |
| 2009/0131585 A1 | 5/2009 | Prasse | |

FOREIGN PATENT DOCUMENTS

| | | | |
|---|---|---|---|
| CN | 102618209 A | * | 8/2012 |
| DE | 1120690 B | | 12/1961 |
| DE | 1301140 B | | 8/1969 |
| DE | 2229216 A1 | | 12/1972 |
| DE | 2500020 A | * | 7/1976 |
| DE | 3750966 T2 | | 8/1995 |
| DE | 102006061584 A1 | | 7/2008 |
| DE | 102007037197 A1 | | 2/2009 |
| FR | 1188495 A | | 9/1959 |
| JP | 2014/084398 | * | 5/2014 |
| WO | WO 99/63003 | * | 12/1999 |

OTHER PUBLICATIONS

Machine translation of JP 2014/084398 (no date).*
Machine translation for CN 102618209 (no date).*
Extended European Search Report issued in EP 21157679.8, dated May 26, 2021.
International Search Report issued in PCT/EP2021/053898, dated May 28, 2021.
Second Office Action issued on Jan. 26, 2022, in German Patent Application No. DE102020202971.7.
First Office Action issued on Jun. 15,20220 for German Patent Application No. DE102020202971.7.

* cited by examiner

*Primary Examiner* — Marc S Zimmer
(74) *Attorney, Agent, or Firm* — Meunier Carlin & Curfman LLC

(57) ABSTRACT

The invention relates to a preparation for producing a polymer crosslinkable by condensation reaction, which comprises at least one aminopropyltriethoxysilane and at least one polydialkylsiloxane having two terminal hydroxyl groups, wherein the polydialkylsiloxane is represented by the following formula (1):

HO—[—$SiR_1R_2$—O—]$_x$—OH     formula (1)

wherein in formula (1) $R_1$ and $R_2$ may be the same or different and may be selected from the group consisting of alkyl groups having 1 to 8 carbon atoms and wherein x is an integer from 30 to 2500.

16 Claims, No Drawings

PREPARATION FOR PRODUCING A POLYMER CROSSLINKABLE BY CONDENSATION REACTION, POLYMER COMPOSITION CROSSLINKABLE BY CONDENSATION REACTION, PROCESS FOR PRODUCING A SILICONE ELASTOMER AND SILICONE ELASTOMER

DESCRIPTION

The present invention relates to a preparation for producing a polymer crosslinkable by condensation reaction, a polymer composition crosslinkable by condensation reaction, a process for producing a silicone elastomer, and a silicone elastomer produced by the process.

Silicone elastomers are characterized by excellent soft-elasticity properties. Attempts have been made to prepare silicone elastomers by cold-crosslinking hydroxyl-terminated polydimethylsiloxanes with ethoxysilanes, wherein vulcanization is done by exposure to atmospheric moisture. However, it has been shown that even when excluding atmospheric moisture, stiffening or even curing could not be prevented. Thus, production of a polymer composition that can be stored under exclusion of atmospheric moisture has previously not been possible. From DE 10 2007 037 197 A1 a process for producing a silicone elastomer is known, in which polydimethylsiloxanes comprising terminal hydroxyl groups are reacted with triethoxysilanes containing a nitrogen heterocycle as a fourth substituent. However, production of that specific triethoxysilane is laborious and costly due to the incorporation of the heterocycle.

Starting from this prior art, it is an object of the present invention to provide a preparation for producing a polymer crosslinkable by condensation reaction, which is storage-stable under moisture exclusion. Furthermore, it is an object of the present invention to provide a polymer composition crosslinkable by condensation reaction which vulcanizes when exposed to moisture while releasing ethanol and which is used to produce a silicone elastomer having excellent mechanical and physical properties. Furthermore, it is an object of the present invention to provide an easy and inexpensive method for producing a silicone elastomer, and a silicone elastomer produced by the method, wherein the silicone elastomer is characterized by excellent mechanical and physical properties.

The present invention is characterized by the features of the independent claims. Advantageous further embodiments are set forth in the subclaims.

Thus, according to a first aspect, the present invention relates to a preparation for producing a polymer crosslinkable by condensation reaction. The preparation contains at least one aminopropyltriethoxysilane and at least one polydialkylsiloxane having two terminal hydroxyl groups. The polydialkylsiloxane has the following formula (1):

HO—[—SiR$_1$R$_2$—O—]$_x$—OH     formula (1)

wherein in formula (1) R$_1$ and R$_2$ may be the same or different and are selected from the group consisting of alkyl groups having 1 to 8 carbon atoms and wherein x is an integer of 30 to 2500. The polydialkylsiloxane preferably has a viscosity of from 20,000 to 350,000 mPa.s at 23° C., as measured according to ISO 3219 of 1993, which promotes incorporation of the aminopropyltriethoxysilane so that a homogeneous preparation can be obtained. Further advantageously, the polydialkylsiloxane is polydimethylsiloxane.

The preparation can be obtained by simply mixing the above components and can be stored under moisture exclusion for a long period of time without changing, decomposing or reacting. Thus, the preparation can easily be prepared and used to produce a polymer that can be crosslinked by condensation reaction. In this context, the preparation may contain other components, with the proviso that they do not initiate or promote premature reaction of the respective components essential to the invention.

Owing to high availability and reactivity of condensation polymerization reactions, aminopropyltriethoxysilane is selected from 3-aminopropyltriethoxysilane, cyclohexylaminopropyltriethoxysilane and N-(2-aminoethyl)-3-aminopropyltriethoxysilane.

To obtain a stable preparation having high potential of reaction, a mass ratio of the polydialkylsiloxane to the aminopropyltriethoxysilane is preferably 20:1 to 50:1, with a mass ratio of about 31:1 to 36:1 being particularly advantageous.

To improve elastic properties of the silicone elastomer to be produced, the preparation preferably contains at least one silicone plasticizer, the silicone plasticizer being selected especially from the group consisting of trimethylsiloxy-terminated polydimethylsiloxanes having a viscosity of from 35 to 1000 mPa.s at 23° C., as measured according to ISO 3219 of 1993.

In another aspect of the invention, a polymer composition crosslinkable by condensation reaction is also described. In this regard, the polymer composition according to the invention contains the storage-stable preparation according to the invention described above. In addition, the polymer composition contains at least one ethoxy-functional crosslinking agent for crosslinking the polydialkylsiloxane contained in the preparation, wherein the crosslinking agent especially is at least one ethoxy-functional silicon-containing crosslinking agent to further improve the silicone properties. Furthermore, the polymer composition contains at least another aminopropyltriethoxysilane, which may be the same as or different from the aminopropyltriethoxysilane contained in the preparation. The polymer composition continues to be stable in the absence of moisture, but may react to form a silicone elastomer upon exposure to moisture (moisture or addition of water), wherein at least the aminopropyltriethoxysilane reacts with the polydialkylsiloxane of the preparation and the ethoxy-functional crosslinking agent to form a silicone elastomer by condensation reaction. The silicone elastomer formed from the polymer composition is characterized by soft-elasticity properties and good mechanical and physical properties. Simultaneously, the polymer composition may contain other processing components, such as colorants, polymerization inhibitors, fillers, pigments or fragrances.

Owing to excellent crosslinking properties, the ethoxy-functional crosslinking agent is preferably selected from the group consisting of methyltriethoxysilane, vinyltriethoxysilane, tetraethylsilicate, a partial hydrolysate of tetraethylsilicate and 1,2-bis(triethoxysilyl)ethane.

To adapt the mechanical and physical properties of the silicone elastomer, the polymer composition may preferably further comprise at least one filler. In addition, at least one crosslinking catalyst may be provided alternatively or additionally to promote the polymerization reaction.

Suitable fillers especially include quartz or quartz flour, chalk, diatomaceous earth, calcium silicate, titanium oxide, iron oxide, zinc oxide, calcium carbonate, fumed, highly dispersed silica, precipitated silica and carbon black.

Suitable crosslinking catalysts include titanium compounds, zirconium compounds, zinc compounds, aluminum compounds or tin compounds.

It has been shown, that highly dispersed silica is a particularly suitable filler, as it increases the mechanical strength of the silicone elastomer, such as tear propagation resistance according to ASTM D624-00 (2012). As a cross-linking catalyst, zinc bis(2-ethylhexanoate has been shown to be suitable, as it is highly reactive, readily commercially available, and apparently is toxicologically safe, contrary to the tin catalysts generally in use.

In another aspect of the invention, a process for producing a silicone elastomer will be described. Herein, the method firstly comprises a step of producing a preparation for producing a polymer crosslinkable by condensation reaction. In this regard, the preparation may be formed as the preparation disclosed above and may be prepared by mixing. Thus, the preparation contains at least one aminopropyltriethoxysilane and at least one polydialkylsiloxane having two terminal hydroxyl groups, which has the following formula (1):

$$HO-[-SiR_1R_2-O-]_x-OH \quad \text{formula (1)}$$

wherein, in formula (1), $R_1$ and $R_2$ may be the same or different and are selected from the group consisting of the group consisting of alkyl groups having 1 to 8 carbon atoms and wherein x is an integer of from 30 to 2500. The preparation obtained in this way is storage stable under moisture exclusion, and, in a next process step, is required to be stored under moisture exclusion at room temperature for a period of at least 9 days to 12 weeks before further processing. In particular, a storage period of about two weeks is advantageous, whereas storage periods of less than 9 days are not sufficient. Without being bound by theory, the reason for storing is presumably that reaction of the aminopropyltriethoxysilane with the hydroxyl end groups of the polydialkylsiloxane proceeds very slowly, and it is therefore advantageous to wait for an extensive degree of conversion. Premature use of the preparation to produce the polymer composition results in stiffening or even curing, so that transferring it into a moisture-proof container will not be possible. It is presumably necessary to largely remove the hydroxyl end groups to obtain a desirable polymer composition that is stable under moisture exclusion with respect to the pasty consistency.

In another process step, at least one ethoxy-functional crosslinking agent is added to the stored preparation, which crosslinking agent is in particular at least one ethoxy-functional silicon-containing crosslinking agent especially selected from the group consisting of methyltriethoxysilane, vinyltriethoxysilane, tetraethylsilicate, a partial hydrolysate of tetraethylsilicate and 1,2-bis(triethoxysilyl)ethane. Furthermore, at least another aminopropyltriethoxysilane is added to the stored preparation, wherein the aminopropyltriethoxysilane may be the same as or different from the aminopropyltriethoxysilane contained in the preparation. This mixture provides a reaction mixture for subsequent polymerization reaction, which is performed as a condensation reaction.

Thus, in another process step, the reaction mixture is reacted under the influence of moisture by condensation of the amine-functionalized polydialkylsiloxane, the aminopropyltriethoxysilane and the ethoxy-functional crosslinking agent. In particular, moisture can be introduced by atmospheric moisture promoting especially uniform polymerization reaction. Alternatively, a specified amount of water may also be added.

The process enables production of a silicone elastomer having excellent soft-elasticity, physical and mechanical properties in an easy and cost-effective manner. The process according to the invention may be implemented without great industrial effort.

To promote the reaction rate, the process may further comprise a step of adding at least one crosslinking catalyst to the stored preparation.

The advantages, advantageous effects and further embodiments as set forth for the preparation according to the invention, polymer preparation and process according to the invention as disclosed above each find mutual application.

As another aspect of the invention, a silicone elastomer is also described which can be produced by the process according to the invention. It is characterized in that at least the polydialkylsiloxane, the aminopropyltriethoxysilane and the ethoxy-functional crosslinking agent are bonded to each other by condensation, the ethoxy-functional crosslinking agent being especially selected from the group consisting of methyltriethoxysilane, vinyltriethoxysilane, tetraethylsilicate, a partial hydrolysate of tetraethylsilicate and 1,2-bis(triethoxysilyl)ethane. This results in generating soft-elasticity structures in the silicone elastomer and excellent physical and mechanical properties, such as low ShoreA hardness.

The silicone network is formed by reacting the hydroxyl end groups of the polydialkylsiloxane and the ethoxy groups of the crosslinking agent, the hydroxyl end groups being formed by moisture exposure. The polymer loses its free mobility, thus loosing flowability of the polymer composition. A dialkylpolysiloxane having a viscosity of 80,000 mPa.s comprises an average of about 1000 dimethylsiloxane units. In both the non-crosslinked and the crosslinked state, the polymer chains are not stretched, but are disordered and entangled. Interaction of the polymer chains with each other is very low. The network can be deformed even when applying only a small force, and the original, disordered state is restored when the force is released. The flowable or soft-paste polymer composition is thus converted into a soft-elasticity elastomer.

EXAMPLES

The present invention will be explained in more detail while making reference to the examples, but is not limited thereto.

Example 1—Production of a First Preparation for Producing a Polymer Crosslinkable by Condensation Reaction The following components were weighed into a screw-cap vessel and intermixed using a narrow spatula and stored under moisture exclusion for two weeks at room temperature (22° C.):

141.7 g of a hydroxyl-terminated polydimethylsiloxane having a viscosity of about 80,000 mPa.s (73.15% by mass), as measured at 23° C. according to ISO 3219 of 1993 (IUPAC: PDMS hydroxy-terminated, CAS: 70131-67-8)

47.7 g of a silicone plasticizer having a viscosity of about 100 mPa.s (24.63% by mass), as measured at 23° C. according to ISO 3219 of 1993 (IUPAC: PDMS methyl-terminated, CAS: 63148-62-9

4.3 g of aminopropyltriethoxysilane (2.22% by mass) (IUPAC: 3-aminopropyltriethoxysilanes, CAS: 919-30-2).

Example 2—Production of a Second Preparation for Producing a Polymer Crosslinkable by Condensation Reaction.

The following components were weighed into a screw-cap vessel and intermixed using a narrow spatula and stored at room temperature (22° C.) for two weeks under moisture exclusion:
- 241.1 g of a hydroxyl-terminated polydimethylsiloxane having a viscosity of about 80,000 mPa.s (72.99% by mass), as measured at 23° C. according to ISO 3219 of 1993 (IUPAC: PDMS hydroxy-terminated, CAS: 70131-67-8)
- 81.6 g of a silicone plasticizer having a viscosity of about 100 mPa.s (24.40% by mass), measured at 23° C. according to ISO 3219 of 1993 (IUPAC: PDMS methyl-terminated, CAS: 63148-62-9)
- 7.6 g of 2-aminoethyl-3-aminopropyltriethoxysilane (2.30% by mass) (IUPAC: 2-aminoethyl-3-aminopropyltriethoxysilane, CAS: 5089-72-5).

Example 3—Production of a Third Preparation for Producing a Polymer Crosslinkable by Condensation Reaction.

The following components were weighed into a screw-cap vessel and intermixed using a narrow spatula and stored at room temperature (22° C.) for two weeks under moisture exclusion:
- 329.1 g of a hydroxyl-terminated polydimethylsiloxane having a viscosity of about 80 000 mPa.s (73.20% by mass), measured at 23° C. according to ISO 3219 of 1993 (IUPAC: PDMS hydroxy-terminated, CAS: 70131-67-8)
- 110.5 g of a silicone plasticizer having a viscosity of about 100 mPa.s (24.58% by mass), measured at 23° C. according to ISO 3219 of 1993 (IUPAC: PDMS methyl-terminated, CAS: 63148-62-9)
- 10.0 g of aminopropyltriethoxysilane (2.22% by mass) (IUPAC: 3-aminopropyltriethoxysilanes, CAS: 919-30-2).

Example 4—Production of a Fourth Preparation for Producing a Polymer Crosslinkable by Condensation Reaction.

The following components were weighed into a screw-cap vessel and intermixed using a narrow spatula and stored at room temperature (22° C.) for two weeks under moisture exclusion:
- 176.5 g of a hydroxyl-terminated polydimethylsiloxane having a viscosity of about 80 000 mPas.s (73.51% by mass), as measured at 23° C. according to ISO 3219 of 1993 (IUPAC: PDMS hydroxy-terminated, CAS: 70131-67-8)
- 59.2 g of a silicone plasticizer having a viscosity of about 100 mPa.s (24.66% by mass), as measured at 23° C. according to ISO 3219 of 1993 (IUPAC: PDMS methyl-terminated, CAS: 63148-62-9)
- 4.4 g of 2-aminopropyltriethoxysilane (1.83% by mass) (IUPAC: 3-aminopropyltriethoxysilanes, CAS: 919-30-2).

Example 5—Production of a First Polymer Composition A Crosslinkable by Condensation Reaction In a paper drinking cup, the components of composition A listed below were uniformly mixed using a narrow spatula and poured into a screw-top can and then sealingly stored under moisture exclusion.

- 35.7 g of preparation from example 1, storage time: 2 weeks at room temperature under moisture exclusion (82.83% by mass)
- 2.5 g of tetraethyl silicate (5.80% by mass) (IUPAC: tetraethyl orthosilicate, CAS: 78-10-4)
- 0.8 g of aminopropyltriethoxysilane (1.86% by mass) (IUPAC: 3-aminopropyltriethoxysilanes, CAS: 919-30-2)
- 0.6 g of zinc bis(2-ethylhexanoate) (1.39% by mass) (IUPAC: Zinc bis(2-ethylhexanoate), CAS: 136-53.8)
- 3.5 g of hydrophilic, highly dispersed silica (HDK® V15, Wacker Chemie; 8.12% by mass) (IUPAC: dioxosilanes, CAS: 112945-52-5)

The consistency of the polymer composition the day after production and after 4 weeks of storage at room temperature under moisture exclusion was soft and pasty and stable.

The skin formation time was about 60 minutes at 23.9° C. and 24% relative moisture. The skin formation time was determined by slightly touching the surface of freshly spread composition with the tip of a pencil at 3 minute intervals. The skin formation time is completed when no composition remains attached to the tip of the pencil.

After 24 hours of open storage (i.e. under the influence of moisture) at room temperature, 22° C., an elastic skin with a dry surface was formed.

The ShoreA hardness of the cured polymer composition, measured according to DIN 53505-87, was 23.

The appearance of the resulting silicone elastomer was slightly cloudy and translucent.

Example 6—Production of a Second Polymer Composition B Crosslinkable by Condensation Reaction In a paper drinking cup, the components of composition B listed below were uniformly mixed using a narrow spatula and poured into a screw-top can and then sealingly stored under moisture exclusion.

- 35.5 g of preparation from example 1, storage time: 2 weeks at room temperature under moisture exclusion (82.56% by mass)
- 2.5 g of vinyltriethoxysilane (5.81% by mass) (IUPAC: vinyltriethoxysilanes, CAS: 78-08-0)
- 0.3 g of aminopropyltriethoxysilane (0.70% by mass) (IUPAC: 3-aminopropyltriethoxysilanes, CAS: 919-30-2)
- 0.6 g of zinc bis(2-ethylhexanoate), (1.40% by mass) (IUPAC: Zinc bis(2-ethylhexanoate), CAS: 136-53.8)
- 4.1 g of hydrophilic, highly dispersed silica (HDK® V15, Wacker Chemie; 9.43% by mass) (IUPAC: dioxosilanes, CAS: 112945-52-5)

The consistency of the polymer composition the day after production and after 4 weeks of storage at room temperature under moisture exclusion was soft and pasty and stable.

The skin formation time was about 45 minutes at 23.9° C. and 24% relative moisture. The skin formation time was measured as described above.

After 6 hours of open storage (i.e. under the influence of moisture) at room temperature, 22° C., an elastic skin with a dry surface was formed.

The ShoreA hardness of the cured polymer composition, measured according to DIN 53505-87, was 26.

The appearance of the resulting silicone elastomer was slightly cloudy and translucent.

Example 7—Production of a Third Polymer Composition B Crosslinkable by Condensation Reaction In a paper drinking cup, the components of composition C listed below were uniformly mixed using a narrow spatula and poured into a screw-top can and then sealingly stored under moisture exclusion.

32.9 g of preparation from example 2, storage time: 2 weeks at room temperature under moisture exclusion (78.33% by mass)

2.2 g of vinyltriethoxysilane (5.24% by mass) (IUPAC: Vinyltriethoxysilane, CAS: 78-08-0)

1.1 g of 1,2 bis-(triethoxysilyl)ethane (2,62% by mass) (IUPAC 1,2-Bis(triethoxysilyl)ethane, CAS : 16068-37-4)

1.4 g of aminopropyltriethoxysilane (3.33% by mass) (IUPAC: 3-Aminopropyltriethoxysilane, CAS: 919-30-2)

0.9 g of zinc-bis(2-ethylhexanoate), (2.14% by mass) (IUPAC: Zinc bis(2-ethylhexanoate), CAS: 136-53,8)

3.5 g of hydrophilic, highly dispersed silica (HDK® V15, Wacker Chemie; 8.33% by mass) (IUPAC: Dioxosilane, CAS: 112945-52-5)

The consistency of the polymer composition the day after production and after 4 weeks of storage at room temperature, 22° C., under moisture exclusion was soft and pasty and stable.

The skin formation time was about 60 minutes at 23.9° C. and 24% relative moisture. The skin formation time was measured as described above.

After 24 hours of open storage (i.e. under the influence of moisture) at room temperature, 22° C., an elastic skin with a dry surface was formed.

The ShoreA hardness of the cured polymer composition, measured according to DIN 53505-87, was 24.

The appearance of the resulting silicone elastomer was whitish and cloudy.

Example 8—Production of a Fourth Polymer Composition D Crosslinkable by Condensation Reaction In a paper drinking cup, the components of composition D listed below were uniformly mixed using a narrow spatula and poured into a screw-top can and then sealingly stored under moisture exclusion.

70.8 g of preparation from example 3, storage time: 2 weeks at room temperature under moisture exclusion (83.29% by mass), 7.0 g of hydrophilic, highly dispersed silica (HDK® V15, Wacker Chemie (8.24% by mass) (IUPAC: Dioxosilane, CAS:112945-52-5), 4.0 g of tetraethyl silicate (4.71% by mass) (IUPAC: Tetraethyl orthosilicate, CAS: 78-10-4), 1.3 g aminopropyltriethoxysilane (1,53 Masse %) (IUPAC: 3-Aminopropyltriethoxysilane, CAS: 919-30-2), 1.9 g of zinc-bis(2-ethylhexanoate) (2.24% by mass) (IUPAC: Zinc bis(2-ethylhexanoate), CAS: 136-53-8).

Consistency 24 h post-production: flowing off the spatula.

For curing, 40.0 g of composition D and 1.5 g of distilled water (3.75% by mass) was mixed in a paper drinking cup and poured into a small screw vial lined with release film and stored in a sealed container. After 18 hours, the contents of the screw vial were dry and fully vulcanized.

The processing time was determined on another sample of the composition. For this purpose, a spatula was dipped into the composition and removed. As long as the composition flowed off the spatula, the end of the processing time had not yet been reached. The end of the processing time was reached when the strand of the composition flowing off was disrupted and slightly retracted upwards and was thus shortened.

The processing time of composition D by this method was 35 minutes at 25° C. and 23% relative humidity.

Example 9—Production of a Fifth Polymer Composition E Crosslinkable by Condensation Reaction In a paper drinking cup, the components of composition E listed below were uniformly mixed using a narrow spatula and poured into a screw-top can and then sealingly stored under moisture exclusion.

71.0 g of preparation from example 4, storage time: 2 weeks at room temperature under moisture exclusion (83,33% by mass), 7.0 g of hydrophilic highly dispersed silica (HDK® V15, Wacker Chemie (8,22% by mass) (IUPAC: Dioxosilane, CAS: 11945-52-5), 4.0 g of vinyltriethoxysilane (4.69% by mass) (IUPAC: Vinyltriethoxysilane, CAS: 78-08-0), 1.3 g of aminopropyltriethoxysilane (1.53% by mass) (IUPAC: 3-Aminopropyltriethoxysilane, CAS: 919-30-2), 1.9 g of zinc-bis(2-ethylhexanoate), (2.23% by mass) (IUPAC: Zinc bis(2-ethylhexanoate), CAS: 136-53-8).

Consistency 24 h post-production: flowing off the spatula.

For curing, 40.0 g of composition E and 1.2 g of distilled water (3.00% by mass) were mixed in a paper drinking cup and poured into a small screw vial lined with release film and stored in a sealed container. After 18 hours, the contents of the screw vial were dry and fully vulcanized.

Processing time of composition E at 24.4° C. and 24% relative humidity: 75 minutes, with the processing time determined as indicated in Example 8.

Example 10—Production of a Sixth Polymer Composition F Crosslinkable by Condensation Reaction In a paper drinking cup, the components of composition F listed below were uniformly mixed using a narrow spatula and poured into a screw-top can and then sealingly stored under moisture exclusion.

71.8 g of preparation from example 4, storage time at room temperature: 2 weeks under moisture exclusion (63.09% by mass), 36.3 g quartz flour (31.90% by mass) (IUPAC: Dioxosilane, CAS: 14808-60-7), 4.0 g of condensed tetraethyl silicate having a silicon dioxide content of 40% (3.51% by mass) (IUPAC: Ethyl polysilicate, CAS: 11099-06-2), 0.7 g of aminopropyltriethoxysilan (0.62% by mass) (IUPAC: 3-Aminopropyltriethoxysilane, CAS: 919-3-2), 1.0 g of zinc-bis(2-ethylhexanoat), (0.88% by mass) (IUPAC: Zinc bis(2-ethylhexanoate), CAS:136-53-8).

Consistency 24 h post-production: flowing off the spatula.

For curing, 40.0 g of composition F and 1.0 g of distilled water (2.50% by mass) were mixed and poured into a small screw vial and stored in a sealed container. After 18 hours, the contents of the screw vial were dry and fully vulcanized.

The processing time of composition F was 15 minutes at 24.4° C. and 24% relative humidity, measured in the above examples.

Example 11—Adhesion test

An adhesion test was carried out with the compositions of examples 5 to 7 on various substrates. For this purpose, the compositions were applied to a substrate with a spatula and pressed on slightly. The average layer thickness was up to 3 mm.

After 7 days of room temperature storage at 22° C. under 24% relative humidity, the adhesive bond was examined. The following table outlines the corresponding results. Herein, "+" meant: the vulcanized coating could only be peeled off from the respective substrate with mechanical destruction. "−" meant: the vulcanized coating could be peeled off from the respective substrate without leaving any residue.

| Substrate | Example 5 | Example 6 | Example 7 |
|---|---|---|---|
| glass | + | + | + |
| acrylic glass (plexiglas) | + | − | + |
| copper pipe | + | + | + |
| spruce wood, lath | + | + | + |
| polystyrene, plate | + | + | + |
| tile, glazed | + | + | + |
| tinplate | + | + | + |
| steel plate | + | + | + |
| PVC, pipe | + | + | + |
| ABS, plate | + | + | + |
| aluminum, foil | + | + | + |

Example 12–Adhesion test

An adhesion test was carried out with the compositions of examples 8 to 10 on various substrates. For this purpose, the compositions were applied to a substrate with a spatula and pressed on slightly. The average layer thickness was up to 3 mm.

After 2 days of room temperature storage at 23° C. under 24% relative humidity, the bond strength was checked. The following table gives an overview of the corresponding results. Herein, "+" meant: the vulcanized coating could only be peeled off from the respective substrate under mechanical destruction. "−" meant: the vulcanized coating could be peeled off from the respective substrate without leaving any residue.

| Substrate | Example 8 | Example 9 | Example 10 |
|---|---|---|---|
| glass | marginal adhesion only | + | + |
| acrylic glass (Plexiglas) | + | + | − |
| tinplate | + | + | + |
| Aluminum foil | + | + | + |
| steel plate | + | + | + |
| copper pipe | + | + | + |
| tile, glazed | − | + | − |
| concrete slab | + | + | + |
| spruce wood, lath | + | + | + |
| ABS, plate | + | + | + |
| PVC, pipe | + | + | − |
| polystyrene plate | + | + | − |

Example 13–Influence of Water Dosage on Vulcanization Behavior

Furthermore, the influence of the water dosage on the vulcanization behavior was investigated. For this purpose, a new batch of composition C was prepared using the preparation from example 3 (repeat batch of composition C).

To 15 g of this repeat batch the following substances were added:
1) No addition
2) 0.2 g dist. water
3) 0.4 g dist. water
4) 0.6 g dist. water The 4 mixtures were each poured into small screw cap vials lined with release film, resulting in a layer thickness of about 1 cm. After a storage time of 24 hours at 24° C. and 23% relative humidity, the vulcanization state of the samples was examined.

The results were as follows:
Sample 1: thin dry skin, still malleable underneath.
Sample 2: thick dry skin, under-vulcanized and very sticky.
Sample 3: fully vulcanized, bottom side dry.
Sample 4: fully vulcanized, bottom side dry.

Following an additional storage time of another 24 hours the vulcanization state of the samples is re-examined.

The following results were obtained:
Probe 1: dry skin, slightly thicker, still malleable underneath.
Probe 2: fully vulcanized, bottom side dry.
Probe 3: fully vulcanized, bottom side dry.
Probe 4: fully vulcanized, bottom side dry.

Interpretation: The deep layer vulcanization is accelerated by the addition of water.

Example 14—Preparation of Flowable Compositions with Highly Dispersed Silica (Wacker, HDK® V 15)

Realization of flowability depends on the process conditions:

When the hydrophilic, highly dispersed silica was admixed at the end of the batch, the result was a stiff and pasty consistency, as desired for one-component compositions.

If the hydrophilic highly dispersed silica was mixed into the presented polymer to form a "stiff phase" followed by addition of the low-viscosity formulation components (crosslinker, catalyst, possibly adhesion promoter), a flowable end product was formed, as is usually desired for two-component compositions.

Basically, materials containing only quartz flour were free-flowing.

The invention claimed is:

1. A preparation for producing of a polymer crosslinkable by condensation reaction consisting of the product obtained when the following materials are stored in the absence of moisture for at least 9 days:
at least one aminopropyltriethoxysilane;
at least one polydialkylsiloxane having two terminal hydroxyl groups and represented by the following formula (1):

HO—[—SiR$_1$R$_2$—O—]$_x$—OH     formula (1)

wherein in formula (1) R$_1$ and R$_2$ are the same or different and are selected from the group consisting of alkyl groups having 1 to 8 carbon atoms and wherein x is an integer of 30 to 2500, and at least one silicone plasticizer, wherein the silicone plasticizer is selected from the group consisting of trimethylsiloxy-terminated polydimethylsiloxanes having a viscosity of from 35 to 1000 mPa.s at 23° C., as measured according to ISO 3219 of 1993.

2. The preparation according to claim 1, wherein the aminopropyltriethoxysilane is selected from 3-aminopropyltriethoxysilane, cyclohexylaminopropyltriethoxysilane and N-(2-aminoethyl)-3-aminopropyltriethoxysilane.

3. The preparation according to claim 1, wherein a mass ratio of the polydialkylsiloxane to the aminopropyltriethoxysilane is 20:1 to 50:1.

4. A polymer composition crosslinkable by condensation reaction comprising:
a preparation for producing of the polymer crosslinkable by condensation reaction consisting of the product obtained when the following materials are stored in the absence of moisture for at least 9 days:
at least one aminopropyltriethoxysilane;
at least one polydialkylsiloxane having two terminal hydroxyl groups and represented by the following formula (1):

HO—[—SiR$_1$R$_2$—O—]$_x$—OH    formula (1)

wherein in formula (1) R$_1$ and R$_2$ are the same or different and are selected from the group consisting of alkyl groups having 1 to 8 carbon atoms and wherein x is an integer of 30 to 2500;
optionally at least one silicone plasticizer, wherein the silicone plasticizer is selected from the group consisting of trimethylsiloxy-terminated polydimethylsiloxanes having a viscosity of from 35 to 1000 mPa.s at 23° C., as measured according to ISO 3219 of 1993;
at least one ethoxy-functional crosslinking agent; and
at least another aminopropyltriethoxysilane, wherein the least another aminopropyltrimethoxysilane is different than the at least one aminopropyltriethoxy silane involved in the formation of the polymer crosslinkable by a condensation reaction.

5. The composition according to claim 4, wherein the ethoxy-functional crosslinking agent is selected from methyltriethoxysilane, vinyltriethoxysilane, tetraethyl silicate, a partial hydrolysate of tetraethyl silicate and 1,2-bis-(triethoxysilyl)ethane.

6. The composition according to claim 4, further comprising at least one filler and/or one crosslinking catalyst.

7. The composition according to claim 6, wherein the filler is selected from the group consisting of chalk, quartz flour and fumed silica and/or wherein the crosslinking catalyst is selected from the group consisting of zinc bis(2-ethylhexanoate).

8. A method for producing a silicone elastomer comprising the steps of:

producing a preparation for producing a polymer crosslinkable by condensation reaction by mixing of:
at least one aminopropyltriethoxysilane and at least one polydialkylsiloxane having two terminal hydroxyl groups and having the following formula (1):HO—[—SiR$_1$R$_2$—O—]$_x$—OH    formula (1)

wherein in formula (1) R$_1$ and R$_2$ are the same or different and arc selected from the group consisting of alkyl groups having 1 to 8 carbon atoms and wherein x is an integer from 30 to 2500;
storing the preparation under exclusion of moisture at room temperature for a period of at least 9 days to 12 weeks;
adding at least one ethoxy-functional crosslinking agent, and at least another aminopropyltriethoxysilane different that the at least one aminopropyltriethoxysilane involved in the formation of the polymer crosslinkable by a condensation reaction to the stored composition to obtain a reaction mixture; and
reacting the reaction mixture under the influence of moisture by condensation of the amine-functionalized polydialkylsiloxane, the aminopropyltriethoxysilane and the ethoxy-functional crosslinking agent.

9. The method according to claim 8, further comprising a step of adding at least one crosslinking catalyst to the stored preparation.

10. A silicone elastomer prepared by the method according to claim 8.

11. A silicone elastomer prepared by the method according to claim 9.

12. The preparation according to claim 2, wherein a mass ratio of the polydialkylsiloxane to the aminopropyltriethoxysilane is 20:1 to 50:1.

13. The composition according to claim 4, wherein the ethoxy-functional crosslinking agent is an ethoxy-functional silicon-containing crosslinking agent.

14. The composition according to claim 5, further comprising at least one filler and/or one crosslinking catalyst.

15. The composition according to claim 14, wherein the filler is selected from the group consisting of chalk, quartz flour and fumed silica and/or wherein the crosslinking catalyst is selected from the group consisting of zinc bis(2-ethylhexanoate).

16. The method according to claim 8, wherein the ethoxy-functional crosslinking agent is an ethoxy-functional silicon-containing crosslinking agent.

\* \* \* \* \*